United States Patent
Smiles et al.

(10) Patent No.: US 9,289,706 B2
(45) Date of Patent: Mar. 22, 2016

(54) FILTER FOR A PIPE

(71) Applicant: AIRBUS OPERATIONS LIMITED, Bristol (GB)

(72) Inventors: Mark Christopher Smiles, Eckington (GB); James Patrick Sandiford, Monmouth (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 124 days.

(21) Appl. No.: 13/772,973

(22) Filed: Feb. 21, 2013

(65) Prior Publication Data

US 2013/0220124 A1 Aug. 29, 2013

(30) Foreign Application Priority Data

Feb. 23, 2012 (GB) .................................. 1203110.0

(51) Int. Cl.
*B01D 46/00* (2006.01)
*B01D 39/14* (2006.01)
*B01D 45/08* (2006.01)
*B01D 50/00* (2006.01)

(52) U.S. Cl.
CPC ................ *B01D 39/14* (2013.01); *B01D 45/08* (2013.01); *B01D 46/0012* (2013.01); *B01D 50/002* (2013.01); *B01D 2275/20* (2013.01)

(58) Field of Classification Search
CPC ...... B01D 39/14; B01D 46/103; B01D 46/68; B01D 46/521; B01D 46/2411
USPC .............. 55/434, 502, 510, 522, 525; 95/273, 95/280; 210/407, 767
See application file for complete search history.

(56) References Cited

U.S. PATENT DOCUMENTS

| | | | |
|---|---|---|---|
| 622,217 A | 4/1899 | Fuller et al. | |
| 2,415,260 A * | 2/1947 | Richards | ..................... 206/524.5 |
| 3,856,491 A * | 12/1974 | Dietrich | ........................... 55/478 |
| 4,604,202 A | 8/1986 | Movshovitz | |
| 2003/0153943 A1* | 8/2003 | Michael et al. | ................ 606/200 |
| 2012/0118802 A1* | 5/2012 | Takai | ........................ 210/170.03 |

FOREIGN PATENT DOCUMENTS

| | | |
|---|---|---|
| DE | 3310711 A1 | 9/1984 |
| FR | 2451768 A | 10/1980 |
| GB | 1134304 A | 11/1968 |
| GB | 1231874 A | 5/1971 |
| GB | 1375210 A | 11/1974 |
| WO | 2011052054 A1 | 5/2011 |

OTHER PUBLICATIONS

Search Report corresponding to GB 1203110.0 dated Jun. 22, 2012.

* cited by examiner

*Primary Examiner* — Jason M Greene
*Assistant Examiner* — Karla Hawkins
(74) *Attorney, Agent, or Firm* — Hauptman Ham, LLP

(57) ABSTRACT

The invention provides a filter for a pipe, the filter comprising an attachment portion for attaching to the pipe, and a filter surface for presentation to and filtering of an oncoming flow of the pipe, wherein the filter surface has at least one pointed apex for protruding into the oncoming flow. The invention also provides a pipe for transporting an oncoming flow, wherein the pipe is provided with a filter surface across the cross-sectional area of the pipe and wherein the filter surface has at least one pointed apex protruding along the longitudinal axis of the pipe. The invention also provides an aircraft with such a filter or pipe and a method of filtering an oncoming flow of a pipe.

31 Claims, 3 Drawing Sheets

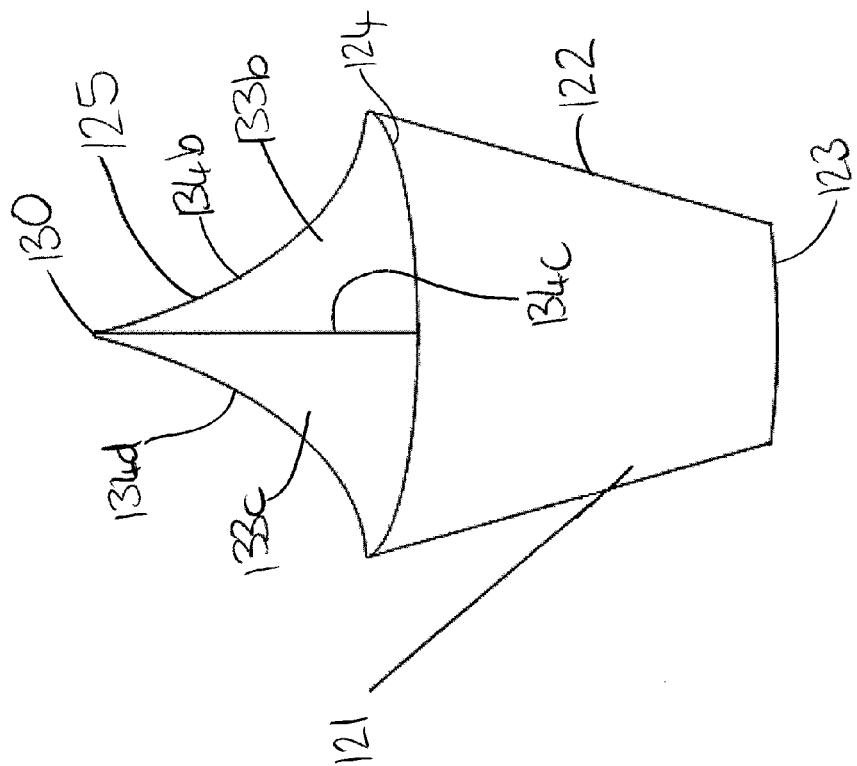
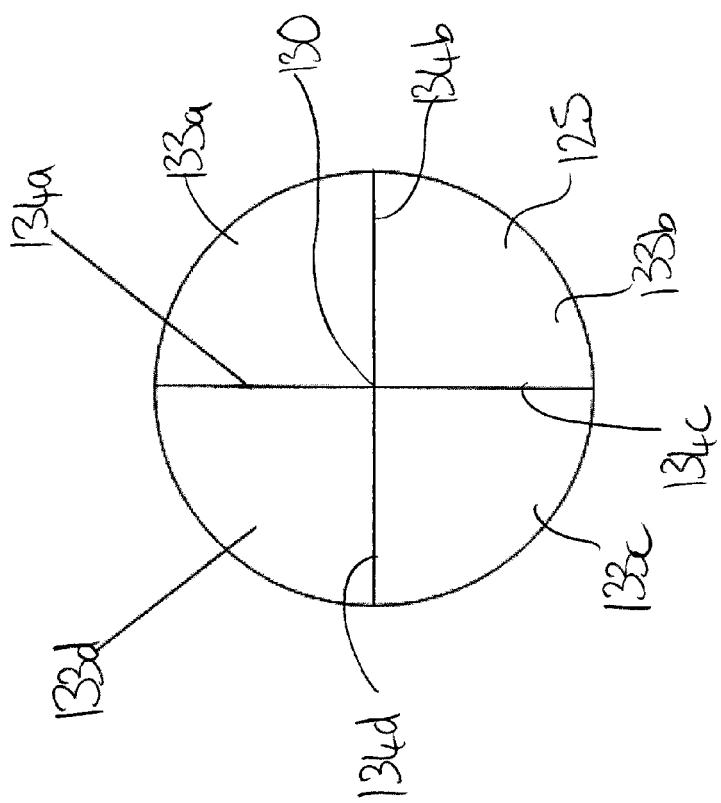
Figure 2b
Figure 2a

FILTER FOR A PIPE

RELATED APPLICATIONS

The present application is based on, and claims priority from, British Application Number 1203110.0, filed Feb. 23, 2012, the disclosure of which is hereby incorporated by reference herein in its entirety.

BACKGROUND OF THE INVENTION

The present invention concerns a filter for a pipe. More particularly, but not exclusively, this invention concerns a filter comprising an attachment portion for attaching to the pipe, and a filter surface for presentation to and filtering of an oncoming flow of the pipe. The invention also concerns a pipe for transporting an oncoming flow, wherein the pipe is provided with a filter surface across the cross-sectional area of the pipe and an aircraft with such a filter or pipe. The invention also concerns a method of filtering an oncoming flow of a pipe.

An aircraft fuel system, for example, has a number of flow devices that use suction pressure to induce flow out of a fuel tank and into a pipe. These flow devices often contain small diameter pipes and nozzles that can become blocked by debris induced into the system from the fuel tanks. Current pipe filters comprise a mesh screen over the pipe inlet. The mesh screen can be either flat across the pipe inlet or can be slightly rounded to form a convex end on the pipe inlet.

These types of mesh screen can cause a variety of problems. For example, the mesh screen inevitably blocks some of the pipe inlet area and so causes a pressure drop across the pipe inlet and a loss of efficiency. Furthermore, partial blockage of the filter results in a further pressure drop across the filter and further loss of efficiency. Also, a debris particle that is larger than the pipe inlet diameter can be held against the mesh screen by suction pressure and can completely block the inlet. In addition, the mesh screens are susceptible to ice formation, especially where the pipe inlet is located in an area of relatively high water concentration, for example in the inlet to a water scavenge jet pump. Ice formation can also lead to a partial or full blockage of the pipe. In order to prevent ice formation, larger-holed mesh screens can be used but these can cause larger debris particles to pass through the filter and can cause blockage in the systems.

Blockages are often only found when a problem occurs and are very difficult and time consuming to discover. Furthermore, cleaning the blockages, for example for filters in aircraft fuel tank systems, requires entry into the aircraft fuel tank. This is expensive and raises several health and safety concerns.

The present invention seeks to mitigate the above-mentioned problems. Alternatively or additionally, the present invention seeks to provide an improved filter or pipe or an improved method of filtering an oncoming flow of a pipe.

SUMMARY OF THE INVENTION

The present invention provides, according to a first aspect, a filter for a pipe, the filter comprising an attachment portion for attaching to the pipe, and a filter surface for presentation to and filtering of an oncoming flow of the pipe, wherein the filter surface has at least one pointed apex for protruding into the oncoming flow.

The pointed apex deflects large debris particles away from the filter and prevents large debris particles from "sitting" on the filter surface. This prevents the filter being partially or completely blocked by a large debris particle.

In addition, flow into the pipe inlet is accelerated along the sides of the filter surface from the apex, giving a higher local fluid velocity along the sides of the filter surface. This helps to prevent ice crystals attaching to the filter surface and reduce the effect of blockages from ice formation.

Large debris particles impact the pointed apex and any frangible debris, including ice, is broken up into smaller debris particles. This also helps to prevent the filter being partially or completely blocked by a large debris particle. Also, the inlet flow will accelerate debris particles towards the centre of the filter surface. Hence, when the pointed apex is preferably towards the centre of the filter surface, these large debris particles are urged towards the pointed apex.

When referring to a flow of the pipe, this should be understood as meaning flow within the pipe or flow that is approaching an inlet of the pipe.

When referring to the pointed apex, this should be understood as meaning an apex that has a significant point suitable for breaking up pieces of debris.

Preferably, the filter has a diameter in the region of between 8 and 80 mm, preferably between 10 and 30 mm, and more preferably approximately 20 mm. Preferably, the filter is for use with a pipe with a diameter in the region of between 5 and 50 mm, preferably between 5 and 20 mm and more preferably approximately 12 mm. Preferably, the filter and/or pipe are designed for dealing with flows in the region of between 3 and 1000 liters/minute, preferably between 10 and 30 liters/minute and more preferably approximately 20 liters/minute. The filter is preferably designed to filter a flow to remove debris with a diameter in the region of between 2 mm and 50 mm and more preferably between of 2 mm and 10 mm.

Preferably, in use, the apex faces substantially the opposite direction to the direction of the oncoming flow. This provides maximum potential for breaking up debris particles and preventing them for "sitting" on the filter surface.

Preferably, the filter surface is in the form of a pyramidal shape with a number of substantially triangular faces. The pyramidal shape is generally in the form of a cone, except with a number of faces around the apex rather than a single smooth conical surface. The faces are generally triangular, with a rounded convex base corresponding to what would have been the circular base of the cone.

More preferably, at least one of the faces of the filter surface is open to allow the oncoming flow to pass through that face of the filter surface and wherein at least one of the faces is substantially solid, thereby deflecting debris from the filter surface.

Even more preferably, the solid and open faces of the filter surface are alternately circumferentially disposed around the apex. Hence, any smaller debris particles can only block one face of the filter surface and do not cause a large pressure drop across the filter.

Alternatively, the filter surface comprises plate edges or wires along the corner lengths of the pyramidal shape. The plate edges or wires act to break up large debris and prevent debris "sitting" on the filter surface. The plate edges or wires would also not be prone to ice formation.

Preferably, the filter surface has 4 or 8 faces. Having 8 faces, wherein there are equal numbers of solid and open faces, allows there to be 4 open faces. Having 4 faces, wherein the filter surface comprises plate edges or wire along the corner lengths of the pyramidal shape, also allows there to be 4 open faces.

Having 4 open faces means a blockage of one of the open faces results in 75% of the filter surface still being available and hence, a manageable pressure drop. A larger number of faces would reduce the pressure drop from one face being blocked but would increase the likelihood of ice formation. A smaller number of faces would result in larger debris passing through the filter and a more significant pressure drop if one of the faces was blocked.

Preferably, the filter further comprises a mesh screen for further filtration of the oncoming flow. More preferably, further filtration is provided for oncoming flow that has passed through the open faces of the filter surface.

Preferably, the corner lengths of the pyramidal shape are concave. This means that the faces of the filter surface curve inwards and do not provide a flat area for a debris particle to "sit on". In addition, if a debris particle did "sit" on the concave face, it would be held above the actual filter surface and be liable to be broken by the suction pressure.

Preferably, the filter is an inlet filter for a pipe and wherein the attachment portion is for attaching the filter surface across one end of the pipe.

Preferably, the cross-sectional area across the base of the filter surface is greater than the cross-sectional area of the attachment portion of the filter. This means that the filter surface is relatively large, and may be larger than the cross-sectional area of the pipe.

When referring to the base of the filter surface, this should be understood to mean the dividing line between the region of the filter surface facing the oncoming flow and the region of the filter surface not facing the oncoming flow. For example, if the filter surface comprised two square based pyramids stuck base to base, the surface of the foremost pyramid (the pyramid with its apex protruding into the oncoming flow) would face the oncoming flow and the surface of the rearmost pyramid (the pyramid with its apex pointing away from the oncoming flow) would not. Hence, the base of the filter surface would be the base of the foremost pyramid. Of course, the region not facing the oncoming flow may not be considered to be part of the filter surface at all. Hence, the base of the filter surface can also be defined as the rearmost portion of the filter surface that faces the oncoming flow.

More preferably, the cross-sectional area across the base of the filter surface of the open faces of the pyramidal shape is greater than the cross-sectional area of the attachment portion of the filter. This means that the open filter area is relatively large, and may be larger than the cross-sectional area of the pipe.

Even more preferably, the cross-sectional area across the base of the filter surface of all except one of the open faces of the pyramidal shape is at least as big as the cross-sectional area of the attachment portion of the filter. This means that the open filter area, even when one open face is blocked, is relatively large, and may be larger than the cross-sectional area of the pipe inlet. This ensures that a partial blockage of one of the open faces of the filter surface does not give a pressure drop any greater than the pipe.

Preferably, the filter is for use in a pipe for a fuel system, a hydraulic system or an air system.

Preferably, the filter is for use in a pipe on an aircraft.

The present invention also provides a pipe for transporting an oncoming flow, wherein the pipe is provided with a filter surface across the cross-sectional area of the pipe and wherein the filter surface has at least one pointed apex protruding along the longitudinal axis of the pipe.

Preferably, the cross-sectional area across the base of the filter surface is greater than the cross-sectional area of the pipe. More preferably, the filter surface is in the form of a pyramidal shape with a number of substantially triangular open faces and the cross-sectional area across the base of the filter surface of the open faces of the pyramidal shape is greater than the cross-sectional area of the pipe. Even more preferably, the cross-sectional area across the base of the filter surface of all except one of the open faces of the pyramidal shape is at least as big as the cross-sectional area of the pipe. This ensures that a partial blockage of one of the open faces of the filter surface does not give a pressure drop any greater than the pipe.

Preferably, the pipe is a pipe for a fuel system, a hydraulic system or an air system.

Preferably, the pipe is a pipe for use on an aircraft.

The present invention also provides a fuel system, hydraulic system or air system of an aircraft, comprising a pipe in situ in the system, the pipe being as described above.

The present invention also provides an aircraft comprising a filter or a pipe, as described above.

The present invention also provides a method of filtering an oncoming flow of a pipe, the method comprising the steps of providing a pipe, providing the pipe with a filter surface across the cross-sectional area of the pipe, wherein the filter surface has at least one pointed apex, providing the oncoming flow to the pipe, wherein the pointed apex protrudes into the oncoming flow and acts to break up debris in the flow and/or deflect the debris away from the filter surface.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 1a shows a top view of a filter according to a first embodiment of the invention;

FIG. 1b shows a side view of the filter of FIG. 1a;

FIG. 2a a top view of a filter according to a second embodiment of the invention; and FIG. 2b shows a side view of the filter of FIG. 2a.

DETAILED DESCRIPTION

Figures 1A, 1B:
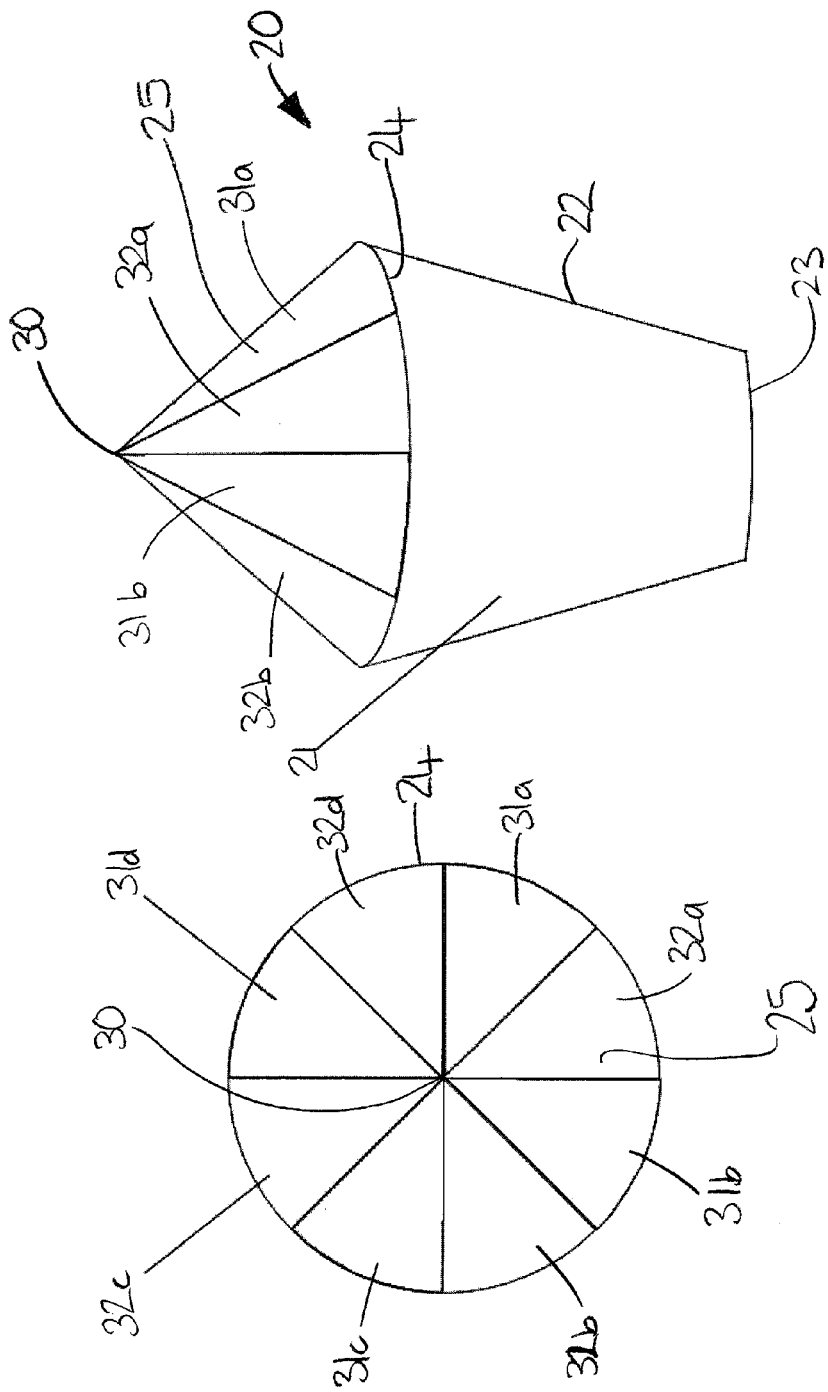

FIGS. 1a and 1b show a filter 20 according to a first embodiment of the invention. The filter 20 comprises a filter body 21 and a filter surface 25 on top of the filter body.

The filter body 21 comprises a narrow circular base 23 for attaching to an inlet of a pipe. The filter body 21 has outwardly tapering sides 22 and a wider circular top portion 24. The filter surface 25 is attached on top of this top portion.

The filter surface 25 is in the general shape of a pyramid with eight substantially triangular faces and a pointed apex 30. The eight faces are triangular, with a rounded convex base corresponding to the circular top portion 24. Four of the faces 31a, 31b, 31c, 31d are open faces and four of the faces 32a, 32b, 32c, 32d are solid faces. The open 31 and closed 32 faces are arranged alternately circumferentially around the apex 30.

Figure 1C:
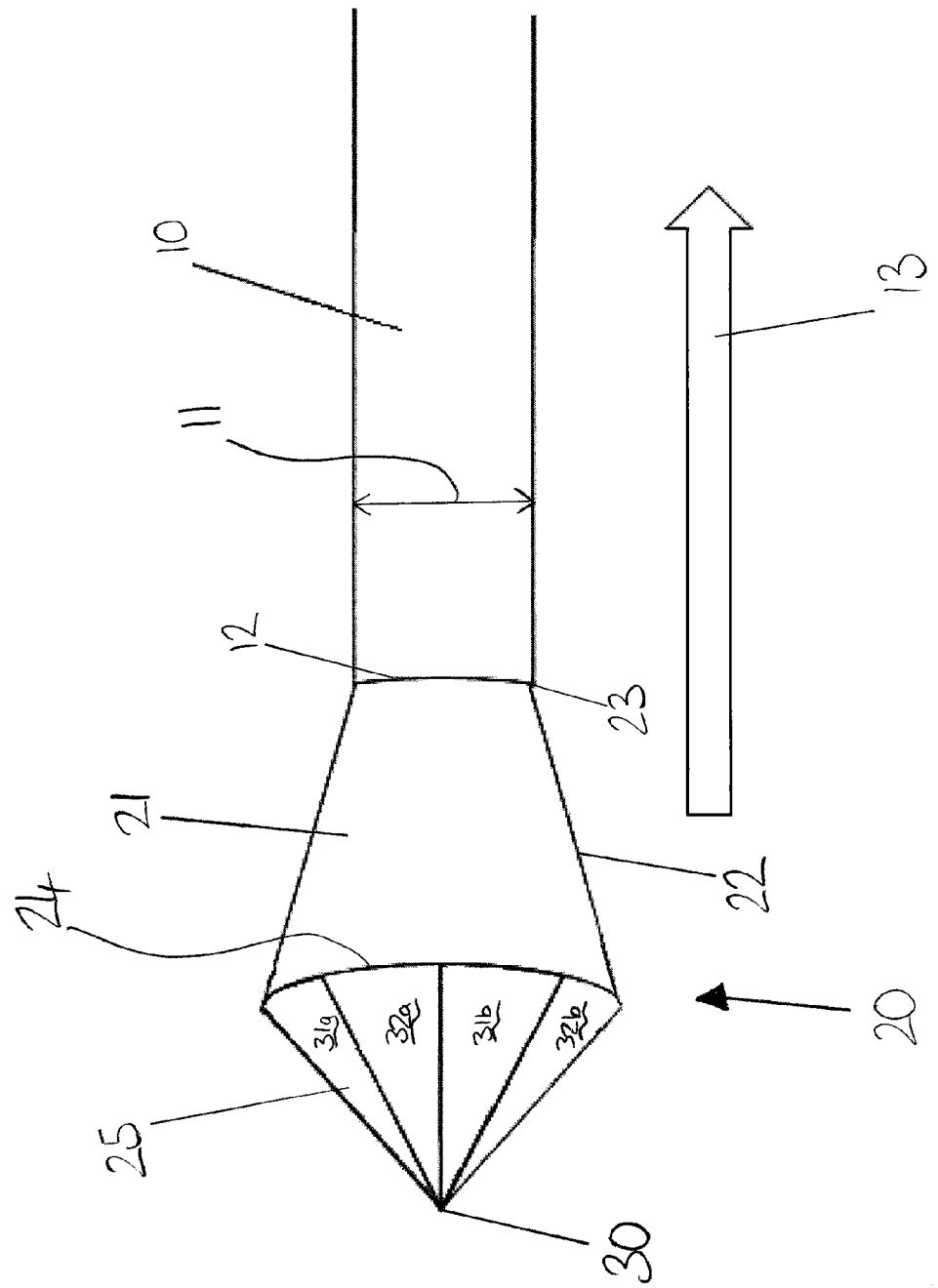
FIG. 1c shows a side view of the filter of FIGS. 1a and 1b in situ on a pipe.

FIG. 1c shows a side view of the filter 20 of FIGS. 1a and 1b in situ on an inlet 12 of a pipe 10. The pipe 10 has a diameter 11. The filter body 21 is attached at its base 23 to the pipe inlet 12. The diameter 11 of the pipe is the same as the diameter of the base 23 of the filter body 21. The arrow 13 represents the oncoming flow direction through the filter surface 25, through the filter body 21, through the pipe inlet 12 and into the pipe 10.

In use, oncoming flow 13 passes through the open faces 31 of the filter surface 25 into the pipe 10. Large pieces of debris in the flow 13 may impact on the pointed apex 30 and be broken up into smaller pieces of debris. The apex 30 may also deflect pieces of debris away from the filter surface 25. The solid faces 32 may also deflect and/or break up pieces of debris.

Oncoming flow 13 is directed along the faces 31, 32 of the filter surface 25, causing the oncoming flow in these regions to be faster. This prevents ice formation on the filter surface 25.

Any pieces of debris that are caught on the filter surface 25 may cause one of the open faces 31a, for example, to be blocked. However, this still leaves the other three open faces 31b, 31c, 31d clear and so the pressure drop caused is not particularly large.

The filter 20 is designed such that if one of the open faces 31a, for example, is completely blocked by debris, the three remaining open faces 31b, 31c, 31d still provide the same flow area as the pipe 10. In other words, the partially blocked filter 20 must provide a cross-sectional area at the base of the filter surface 25 (i.e. at the top portion 24 of the filter body 21) the same as the cross-sectional area of the pipe 10.

As an example, the pipe 10 has a diameter 11 of 12 mm and therefore a cross-sectional area ($A_p$) of 113 mm². Therefore the total base area of three of the open faces 31b, 31c, 31d must be $A_p$. As the open faces 31 each have the same area, they must each have a base area ($A_f$) of 37.7 mm² (113 mm²/3).

As each of the eight open 31 and solid 32 faces has the same area ($A_f$), this means that the total cross-sectional area at the base of the filter surface 25 (i.e. at the top portion 24 of the filter body 21), call this $A_b$, must be 301 mm² (8*37.7 mm²). This gives the diameter ($D_b$) of the base of the filter surface (i.e. at the top portion 24 of the filter body 21) as 19.6 mm. Hence, the tapered sides 22 of the filter body 21 taper from a diameter of 12 mm at the pipe inlet 12/narrow circular base 23 of the filter body 21 to a diameter of 19.6 mm at the base of the filter surface 25/top portion 24 of the filter body 21.

FIGS. 2a and 2b show a filter 120 according to a second embodiment of the invention. The filter 120 comprises a filter body 121 and a filter surface 125 on top of the filter body.

The filter body 121 comprises a narrow circular base 123 for attaching to an inlet of a pipe. The filter body 121 has outwardly tapering sides 122 and a wider circular top portion 124. The filter surface 125 is attached on top of this top potion.

The filter surface 125 is in the general shape of a pyramid with four substantially triangular faces 133a, 133b, 133c, 133d and a pointed apex 130. The four faces 133 are triangular, with a rounded convex base corresponding to the circular top portion 124. The four corner lines 134a, 134b, 134c, 134d of the four faces 133 are concave, inwards towards the centre of the filter body 121. Hence, the filter surface 125 is the form of a concave pyramidal shape.

The four faces 133a, 133b, 133c, 133d are open faces. The four corner lines 134a, 134b, 134c, 134d are each provided with a wire running along the corner lines from the apex 30 to the outside diameter of the top portion 124 of the filter body 121.

In use, oncoming flow passes through the open faces 133 of the filter surface 125 into the pipe. Large pieces of debris in the flow may impact on the pointed apex 130 and be broken up into smaller pieces of debris. The apex 130 may also deflect pieces of debris away from the filter surface 125. The wires on the corner lines 134 of the filter surface 125 may also deflect and/or break up pieces of debris.

Oncoming flow is directed along the concave faces of the filter surface 125, causing the oncoming flow in these regions to be faster. This prevents ice formation on the filter surface 125.

Any pieces of debris that are caught on the filter surface 125 may cause one of the open faces 133a, for example, to be blocked. However, this still leaves the other three open faces 133b, 133c, 133d clear and so the pressure drop caused is not particularly large.

The filter 120 is designed such that if one of the open faces 133a, for example, is completely blocked by debris, the three remaining open faces 133b, 133c, 133d still provide the same flow area as the pipe. In other words, the partially blocked filter must provide a cross-sectional area at the base of the filter surface 125 (i.e. at the top portion 124 of the filter body 121) the same as the cross-sectional area of the pipe.

As an example, the pipe has a diameter of 12 mm and therefore a cross-sectional area ($A_p$) of 113 mm². Therefore the total base area of three of the open faces 133b, 133c, 133d must be $A_p$. As the open faces 133 each have the same area, they must each have a base area ($A_f$) of 37.7 mm² (113 mm²/3).

This means that the total cross-sectional area at the base of the filter surface 125 (i.e. at the top portion 124 of the filter body 121), call this $A_b$, must be 151 mm² (4*37.7 mm²). This gives the diameter ($D_b$) of the base of the filter surface (i.e. at the top portion 124 of the filter body 121) as 13.8 mm. Hence, the tapered sides 122 of the filter body 121 taper from a diameter of 12 mm at the pipe inlet/narrow circular base 123 of the filter body 121 to a diameter of 13.8 mm at the base of the filter surface 125/top portion 124 of the filter body 121.

This (13.8 mm) is smaller than the diameter of the base of the filter surface 25 of the first embodiment (19.6 mm). This is because there are no solid faces 32 making up the filter surface of this second embodiment.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

A mesh screen could also be used with either of the two embodiments. For example, a mesh screen could be used as a secondary filter behind the filter 20 or 120. A mesh screen could, for example, be used behind the open faces 31 or 133 of the filters 20 or 120.

The faces 31, 32 of the pyramidal shape of the first embodiment may be concave, as opposed to being straight between the apex 30 and the outside diameter of the top portion 24 of the filter body 21. This would provide a filter surface similar in shape to the filter surface 125 of the second embodiment.

The wires at the corner lines 134 of the pyramidal shape of the second embodiment may not be concave and could simply be straight wires from the apex 130 to the outside diameter of the top portion 124 of the filter body 121. This would provide a filter surface similar in shape to the filter surface 25 of the first embodiment.

The wires on corner lines 134 of the pyramidal shape in the second embodiment could be replaced by plate edges. For example, the filter surface could be made up of four plates substantially in the shape of a right angled triangle. Each plate has a width equal to the radius of the base of the filter surface (i.e. at the top portion of the filter body) and a height equal to the height of the filter surface from the top portion of the filter body to the apex. The plates may be disposed between the top portion of the filter body and the apex such that the hypotenuses of the triangles form plate edges that are part of the filter surface.

The hypotenuses of the triangle plates may be straight (as they would be in a simple right angled triangle), forming a filter surface similar in shape to the filter surface 25 of the first embodiment. Alternatively, the hypotenuses may in fact be concaved inwards towards the centre of the filter body. Hence, the filter surface would be in the form of a concave pyramidal shape, similar to the filter surface 125 of the second embodiment.

The filter 20 or 120 may be made of any suitable material. Preferably, the filter 20 or 120 is made of the same material as the pipe. The filter 20 or 120 may be made of a composite material or a metallic alloy, such as aluminium alloy.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A filter for a pipe, the filter comprising:
    an attachment portion for attaching to the pipe, and
    a filter surface for presentation to and filtering of an oncoming flow of the pipe,
wherein the filter surface has at least one pointed apex for protruding into the oncoming flow, wherein the filter surface is in the form of a pyramidal shape with a number of substantially triangular faces, and wherein at least one of the faces of the filter surface is open to allow the oncoming flow to pass through that face of the filter surface and wherein at least one of the faces is substantially solid, thereby deflecting debris from the filter surface.

2. A filter as claimed in claim 1, wherein, in use, the apex faces substantially the opposite direction to the direction of the oncoming flow.

3. A filter as claimed in claim 1, wherein the solid and open faces of the filter surface are alternately circumferentially disposed around the apex.

4. A filter as claimed in claim 1, wherein the filter surface comprises plate edges or wires along the corner lengths of the pyramidal shape.

5. A filter as claimed in claim 1, wherein the filter surface has 4 or 8 faces.

6. A filter for a pipe, the filter comprising;
    an attachment portion for attaching to the pipe, and
    a filter surface for presentation to and filtering of an oncoming flow of the pipe,
wherein the filter surface has at least one pointed apex for protruding into the oncoming flow, wherein the filter surface is in the form of a pyramidal shape with a number of substantially triangular faces, and wherein the corner lengths of the pyramidal shape are concave.

7. A filter for a pipe, the filter comprising;
    an attachment portion for attaching to the pipe, and
    a filter surface for presentation to and filtering of an oncoming flow of the pipe,
wherein the filter surface has at least one pointed apex for protruding into the oncoming flow, wherein the filter is an inlet filter for a pipe and wherein the attachment portion is for attaching the filter surface across one end of the pipe, and wherein the cross-sectional area of the filter across the base of the filter surface is greater than the cross-sectional area of the attachment portion of the filter.

8. A filter as claimed in claim 7, wherein the filter surface is in the form of a pyramidal shape with a number of substantially triangular faces, and wherein the cross-sectional area across the base of the filter surface of the open faces of the pyramidal shape is greater than the cross-sectional area of the attachment portion of the filter.

9. A filter as claimed in claim 8, wherein the cross-sectional area across the base of the filter surface of all except one of the open faces of the pyramidal shape is at least as big as the cross-sectional area of the attachment portion of the filter.

10. A filter as claimed in claim 1, wherein the filter is for use in a pipe for a fuel system, a hydraulic system or an air system.

11. A filter as claimed in claim 1, wherein the filter is for use in a pipe on an aircraft.

12. A pipe for transporting an oncoming flow, wherein the pipe is provided with a filter surface across the cross-sectional area of the pipe and wherein the filter surface has at least one pointed apex protruding along the longitudinal axis of the pipe, wherein:
    the filter surface is in the form of a pyramidal shape with a number of substantially triangular faces and wherein at least one of the faces of the filter surface is open to allow the oncoming flow to pass through that face of the filter surface and wherein at least one of the faces is substantially solid, thereby deflecting debris from the filter surface.

13. A pipe as claimed in claim 12, wherein the pipe is a pipe for a fuel system, a hydraulic system or an air system.

14. A pipe as claimed in claim 12, wherein the pipe is a pipe for use on an aircraft.

15. A fuel system, hydraulic system or air system of an aircraft, comprising a pipe in situ in the system, the pipe being as claimed in claim 12.

16. An aircraft comprising a filter according to claim 1.

17. A method of filtering an oncoming flow of a pipe, the method comprising the steps of:
    providing a pipe,
    providing the pipe with a filter surface across the cross-sectional area of the pipe, wherein the filter surface has at least one pointed apex,
    providing the oncoming flow to the pipe, wherein the pointed apex protrudes into the oncoming flow and acts to break up debris in the flow and/or deflect the debris away from the filter surface, wherein:
    the filter surface is in the form of a pyramidal shape with a number of substantially triangular faces and wherein at least one of the faces of the filter surface is open to allow the oncoming flow to pass through that face of the filter surface and
    wherein at least one of the faces is substantially solid, thereby deflecting debris from the filter surface.

18. A filter as claimed in claim 6, wherein the filter surface comprises plate edges or wires along the corner lengths of the pyramidal shape.

19. A filter as claimed in claim 7, wherein the filter surface comprises plate edges or wires along the corner lengths of the pyramidal shape.

20. A filter as claimed in claim 6, wherein the filter surface has 4 or 8 faces.

21. A filter as claimed in claim 7, wherein the filter surface has 4 or 8 faces.

22. A filter as claimed in claim 6, wherein the filter is for use in a pipe for a fuel system, a hydraulic system or an air system.

23. A filter as claimed in claim 7, wherein the filter is for use in a pipe for a fuel system, a hydraulic system or an air system.

24. A filter as claimed in claim 6, wherein the filter is for use in a pipe on an aircraft.

25. A filter as claimed in claim 7, wherein the filter is for use in a pipe on an aircraft.

26. A pipe for transporting an oncoming flow, wherein the pipe is provided with a filter surface across the cross-sectional area of the pipe and wherein the filter surface has at least one pointed apex protruding along the longitudinal axis of the pipe, wherein:
   the filter surface is in the form of a pyramidal shape with a number of substantially triangular faces and wherein the corner lengths of the pyramidal shape are concave.

27. A pipe for transporting an oncoming flow, wherein the pipe is provided with a filter surface across the cross-sectional area of the pipe and wherein the filter surface has at least one pointed apex protruding along the longitudinal axis of the pipe, wherein:
   the filter is an inlet filter for a pipe and wherein the attachment portion is for attaching the filter surface across one end of the pipe and wherein the cross-sectional area of the filter across the base of the filter surface is greater than the cross-sectional area of the attachment portion of the filter.

28. A method of filtering an oncoming flow of a pipe, the method comprising the steps of:
   providing a pipe,
   providing the pipe with a filter surface across the cross-sectional area of the pipe, wherein the filter surface has at least one pointed apex,
   providing the oncoming flow to the pipe, wherein the pointed apex protrudes into the oncoming flow and acts to break up debris in the flow and/or deflect the debris away from the filter surface, wherein:
   the filter surface is in the form of a pyramidal shape with a number of substantially triangular faces and wherein the corner lengths of the pyramidal shape are concave.

29. A method of filtering an oncoming flow of a pipe, the method comprising the steps of:
   providing a pipe,
   providing the pipe with a filter surface across the cross-sectional area of the pipe, wherein the filter surface has at least one pointed apex,
   providing the oncoming flow to the pipe, wherein the pointed apex protrudes into the oncoming flow and acts to break up debris in the flow and/or deflect the debris away from the filter surface, wherein:
   the filter is an inlet filter for a pipe and wherein the attachment portion is for attaching the filter surface across one end of the pipe and wherein the cross-sectional area of the filter across the base of the filter surface is greater than the cross-sectional area of the attachment portion of the filter.

30. An aircraft comprising a filter according to claim 6.

31. An aircraft comprising a filter according to claim 7.

* * * * *